United States Patent [19]

Hoffman, Jr.

[11] Patent Number: 4,513,844
[45] Date of Patent: Apr. 30, 1985

[54] DISC BRAKE SHOE RETAINER ASSEMBLY WITH INSULATION

[75] Inventor: Charles T. Hoffman, Jr., Waynesville, Ohio

[73] Assignee: General Motors Corporation, Detroit, Mich.

[21] Appl. No.: 415,533

[22] Filed: Sep. 7, 1982

[51] Int. Cl.³ .............................................. F16D 65/84
[52] U.S. Cl. ................................. 188/71.6; 188/264 G
[58] Field of Search ................... 188/72.4, 72.5, 73.1, 188/73.31, 73.32, 264 G, 370, 71.6; 77/18.2; 92/168, 248

[56] References Cited

U.S. PATENT DOCUMENTS 3,497,038 2/1970 Schrader et al. .................. 188/370
4,401,012 8/1983 Emmett ................................ 92/248

FOREIGN PATENT DOCUMENTS 1130310 5/1962 Fed. Rep. of Germany ..... 188/72.5
2854247 6/1980 Fed. Rep. of Germany ... 188/264 G Primary Examiner—Bruce H. Stoner, Jr.
Assistant Examiner—Alvin Oberley
Attorney, Agent, or Firm—D. D. McGraw

[57] ABSTRACT

A noise and heat insulator is incorporated in a brake shoe retainer assembly which holds the shoe to the disc brake piston.

1 Claim, 3 Drawing Figures

DISC BRAKE SHOE RETAINER ASSEMBLY WITH INSULATION

The invention relates to a disc brake in which the brake shoe activated directly by a piston is retained on the piston, and more particularly to a retainer assembly which provides noise and heat insulation. The retainer assembly includes an annular retainer body having a channel-like cross section fitting over the annular end of the piston so as to be removably secured thereto. The annular retainer body is also attached to a retainer clip, which may be generally cup-shaped in cross section or be composed of two or more fingers presenting such a cross section. The clip or cup is suitably attached to the back of the brake shoe forming a part of the brake pad assembly associated with the piston. An insulation material is received within the channel-like annular retainer body and is preferably generally L-shaped in cross section by virtue of having a radially extending flange and a generally annularly extending flange. The radially extending flange of the insulating material is in surface engagement with the piston annular end and the bottom surface of the channel so that it can transfer braking force between the piston and the brake shoe through the channel bottom surface while providing insulation therebetween. The generally axially extending flange fits within the piston annular end and is preferably in surface engagement with either the piston inner peripheral surface adjacent the piston annular end or with the inner peripheral channel side surface of the annular retainer body. The insulation material may be premolded and then suitably secured within the channel either by mechanical means or by adhesive, or may be molded in place therein. The insulation material must be sufficiently incompressible and strong enough to transmit braking forces as above noted and may be made of a phenolic insulating material, by way of example. The assembly provides a snap-on retainer which also acts as a positive brake pad assembly locater. While the insulation material is preferably designed primarily for heat insulation, it also will function as an insulator against transmission of brake noise from the brake shoe to the piston and thence to the caliper.

IN THE DRAWING

Figure 1:
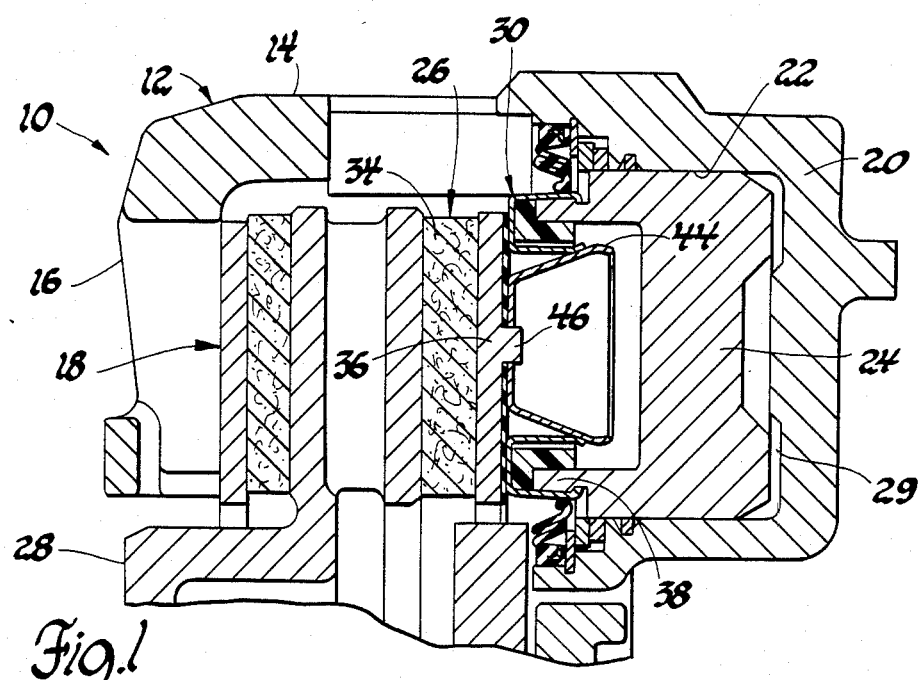
FIG. 1 is a cross-section view of the caliper assembly portion of a disc brake assembly, with parts broken away, and embodying the invention.

The disc brake assembly 10 is illustrated as being of the sliding caliper type wherein the caliper 12 is formed of a bridge section 14, an outboard leg 16 supporting the outboard brake pad assembly 18, and an inboard leg 20 having a cylinder 22 therein receiving the brake actuating piston 24. The inboard brake pad assembly 26 is retained on piston 24. Brake pad assemblies 18 and 26 are positioned on opposite sides of the rotatable disc 28 to be braked. A pressure chamber 29, formed by the closed end of cylinder 22 and one end of piston 24, receives brake actuating pressure in the manner well known in the art to actuate and release the brake assembly. The invention may also be used in other types of caliper assemblies.

The retainer assembly 30 which holds the brake pad assembly 26 on piston 24 is the subject of the invention herein disclosed and claimed. Brake pad assembly 26 includes a brake lining 34 mounted on one side of a brake shoe 36, the opposite side of shoe 36 being operatively engaged by the annular end 38 of piston 24. This engagement takes place through retainer assembly 30.

Figure 2:
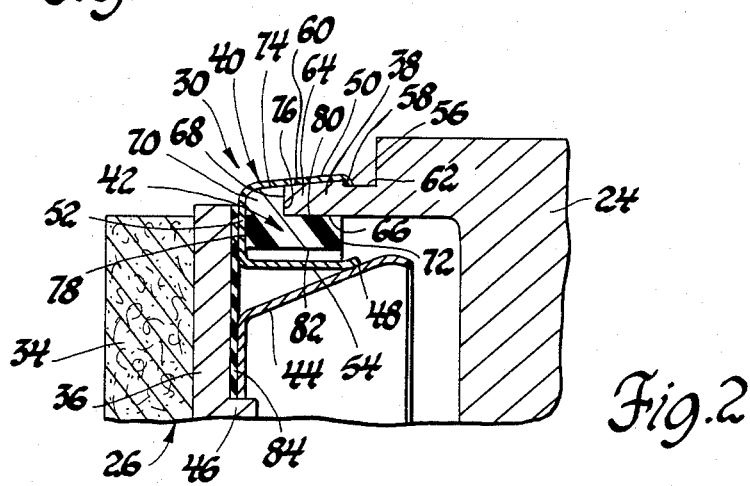
FIG. 2 is an enlarged fragmentary view of the portion of the brake assembly of FIG. 1 particularly pertaining to the invention, and is in cross section with parts broken away.

One embodiment of the retainer assembly 30 is illustrated in FIGS. 1 and 2. The assembly is comprised of an annular retainer body 40, an insulator 42, and a retainer cup or finger arrangement 44. Cup 44 is attached to the back side of shoe 36 by suitable means such as a boss 46 over which the retainer cup 44 is snapped. The cup or finger arrangement 44 is attached at 48 to the retainer body 40. This attachment may be a mechanical snap-in retaining arrangement, a friction arrangement, or a welded arrangement. When the retainer cup or finger device 44 is cup-shaped as shown in the drawing, the retainer body may be installed in position relative to the brake pad assembly and the cup or finger arrangement then secured to boss 46 to mechanically hold the retainer body 40 in position.

The retainer body 40 has a generally channel-like configuration with the open end of the channel receiving the piston annular end 38. The channel has an outer peripheral side surface 50, a bottom surface 52, and an inner peripheral side surface 54. The outer side surface 50 terminates at the open end of the channel in a radially inwardly extending lip 56 which snaps over a shoulder 58 formed on the piston outer peripheral surface 60 of piston annular end 38. It therefore fits into an annular groove 62 formed on the outer peripheral portion 64 of the piston. The piston annular end 38 also has an inner peripheral surface 66 extending axially inwardly of the piston from the end face surface 68 of piston end 38.

The insulation material 42 is shaped to include a radially extending flange 70 and an axially extending flange 72 so that it is generally L-shaped. Flange 70 has its outer peripheral surface 74 engaging the outer peripheral side surface 50 of retainer body 40, within the channel, one flange side surface 76 engaging piston end 68, and the other flange side surface 78 engaging the bottom surface 52 of retainer body 40. The axially extending flange 72 has its radially outer surface 80 engaging the inner peripheral surface 66 of piston end 38 and its radially inner surface 82 radially spaced from the channel inner peripheral side surface 54. Since the insulation 42 is made of a material sufficiently strong to transmit brake forces therebetween, the braking force exerted between piston annular end 38 and the brake shoe 36 is transmitted through insulation flange 70 and channel bottom surface 52. When a noise insulation shim or membrane 84 is provided, it is secured on shoe 36 between the retainer body 40 and the shoe to further assist in noise dampening. Therefore, the brake force is also transmitted through the shim or membrane.

The retainer assembly 30 may be readily preassembled to the pad assembly 26 and may be installed so as to be retained on piston 24 by snapping lip 56 over shoulder 58. The brake pad assembly may be removed in the reverse manner. When retainer cup 44 is formed by a series of flanges, they may be sufficiently resilient to permit the brake pad assembly 26 and retainer cup 44 to be removed while retainer body 40 remains in place on piston 24.

Figure 3:
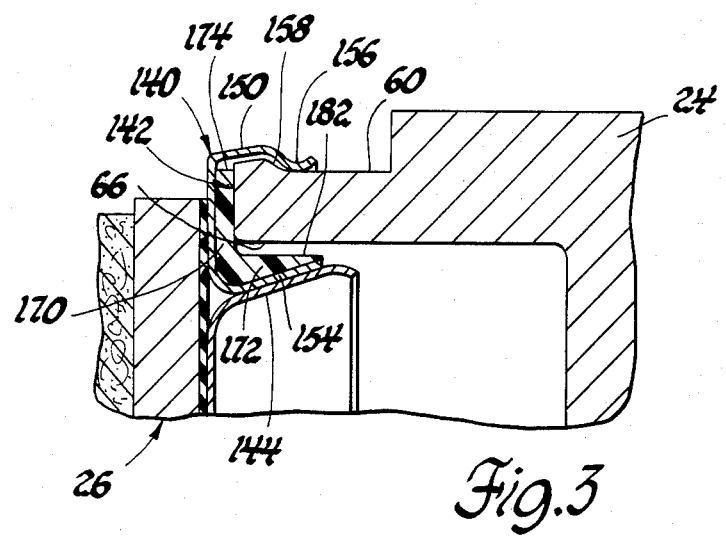
FIG. 3 is similar to FIG. 2 and illustrates a modification of the embodiment of that Figure.

In the modification illustrated in FIG. 3, lip 156 and shoulder 158 are curved in cross section to facilitate snap removal of retainer body 140. The inner peripheral side surface 154 of retainer body 140 is frusto-conical so as to mate with the frusto-conical configuration of the retainer cup 144 in a surface engaging relation rather than the line engagement illustrated in FIG. 2. The insulator 142 has its axially extending flange 172 in surface engagement with the channel inner peripheral side surface 154. The radially outer surface 182 of flange 172 is spaced radially inward from the inner peripheral surface 66 of piston 24. The radially extending flange 170 of insulator 142 is positioned much like that in FIG. 2 but the outer peripheral surface 174 thereof may be spaced radially inward from the channel outer peripheral side surface 150.

In either embodiment, the insulation material may preformed and inserted therein, or may be molded in place. The modification of FIG. 2 is particularly adapted for premolding and insertion, while the modification of FIG. 3 is particularly adapted for molding in place. In either modification, it is desirable to have a spaced relation between the insulator flange 72 or 172 and either the inner peripheral surface 66 of piston 24 or the inner peripheral side surface 54 or 154 of the retainer body 40. This makes it much less likely that the insulator may be cracked during placement or removal of the brake pad assembly relative to the piston.

The embodiments of the invention in which an exclusive property or privilege is claimed are defined as follows:

1. For use in a disc brake, a disc brake shoe retainer assembly for holding a shoe to a disc brake actuating piston and providing noise and heat insulation, the piston having an annular end with an end surface adjacent the shoe to which the retainer assembly is attached, said retainer assembly comprising:

an annular retainer body formed to provide a channel-like configuration adapted to fit over the piston annular end, the channel-like configuration being defined by an outer peripheral side surface having means thereon for gripping the piston in retaining relation against movement axially away from the piston and fitting over an outer peripheral portion of the piston, an inner peripheral side surface arranged to fit within the piston annular end in inwardly spaced relation therefrom and having means thereon for gripping a suitable part of the shoe in retaining relation against movement of the shoe axially away from the piston, and a bottom surface adapted to be positioned axially between the end surface of the piston annular end and the shoe;

and insulation means received within said channel-like configuration and sufficiently coextensive with said bottom surface that the piston may transmit brake applying force from the end surface of the piston annular end through said insulation means and said bottom surface to the brake shoe when the disc brake is actuated, said insulation means being in surface engagement with said bottom surface and said inner peripheral side surface and engageable with the end surface of the piston annular end and radially spaced inwardly from the inner peripheral surface of the piston annular end when said retainer body is fitted to the piston.

* * * * *